CARTRIDGE MOUNTING MECHANISM FOR PHONOGRAPH TONE ARM

Filed March 29, 1962

INVENTOR.
Robert J. Hammond,
BY
Brown, Jackson, Boettcher & Dienner
attys.

United States Patent Office 3,204,968

Patented Sept. 7, 1965

3,204,968

CARTRIDGE MOUNTING MECHANISM FOR PHONOGRAPH TONE ARM

Robert J. Hammond, Stevensville, Mich., assignor to V-M Corporation, Benton Harbor, Mich., a corporation of Michigan Filed Mar. 29, 1962, Ser. No. 183,578
10 Claims. (Cl. 274—37)

The present invention relates to improved cartridge mounting structure for mounting a cartridge in a phonograph tone arm in a vertically compliant manner.

It has been found desirable to provide a phonograph in which the pressure exerted by the needle or stylus on the surface of a record is quite small, for example, on the order of about three grams. In order to provide such light needle pressure, the phonograph tone arm is balanced about its pivotal support so that the outer end or head of the arm will exert the desired downward force.

However, when employing reduced needle pressures, as mentioned above, difficulties have been encountered in providing a tone arm assembly wherein the needle will accurately track in the groove of a record at a relatively constant pressure. In other words, a typical phonograph record is somewhat warped, resulting in the transmission of shocks from the record to the needle and cartridge assembly mounted in the tone arm, thus causing a variation of the needle pressure and consequent inaccurate tracking of the needle in a record groove.

Numerous attempts have heretofore been made to alleviate the foregoing problems by providing a vertically compliant cartridge, that is, one which is adapted to move vertically relative to the tone arm. Where a cartridge or pick-up assembly is adapted to move up and down in accordance with variations in the vertical position of a record being reproduced, without transmitting such movement directly to the tone arm, it is possible to obtain more constant needle pressure and more accurate tracking of the needle in a record groove, while permitting the use of unusually light needle pressure. Another advantage of a vertically compliant cartridge is that the stylus will retract upwardly into the tone arm if a downward force is accidentally applied to the arm, thus protecting the stylus and a record being reproduced thereby from damage.

Previous proposals for a vertically compliant cartridge have commonly comprised securing the cartridge to a bracket which is pivotally mounted relative to the tone arm. In other words, the cartridge is adapted to move in an arcuate path about a horizontal pivot axis which is fixed relative to the tone arm. In some known devices the cartridge bracket includes one or more knife edges which are spring loaded into fixed seat portions provided therefor whereby the knife edges define a pivot axis for the cartridge. In other instances, the cartridge bracket is mounted on a pair of pivots which cooperate therewith to define a horizontal pivot axis, or a pivot pin may extend through suitable apertures in the bracket to pivotally mount the same. In various of the foregoing embodiments, springs are utilized to control the movement of the cartridge and to determine the position of the cartridge when subjected to a given needle pressure.

The foregoing known devices have in common the concept of pivotally mounting the cartridge whereby it will be free to move in an arcuate path about a horizontal pivot axis which is fixed relative to the tone arm. It will be understood that when a cartridge pivots about a horizontal axis which is fixed relative to the tone arm, there is a change in the angular relationship between the cartridge and a record being reproduced thereby. It has been found that such a change in the angle between the cartridge and a record being reproduced, with the resulting change in the needle rake angle or angle between the needle and the record, will produce undesirable fluctuations in the output level during reproducition of the record.

It is an object of the present invention to provide a novel cartridge mounting means for a phonograph tone arm which overcomes the foregoing problems by permitting the cartridge to move vertically relative to the tone arm without altering the angular relationship therebetween.

Another object of the invention is to provide cartridge mounting mechanism of the character mentioned above which is simple and inexpensive to manufacture, and which can be assembled in the head of a phonograph tone arm and adjusted for proper operation with unusual facility.

Other objects, uses and advantages of the invention will become apparent, or be obvious, from the following specification, particularly when considered in connection with the drawings in which.

Figure 1:
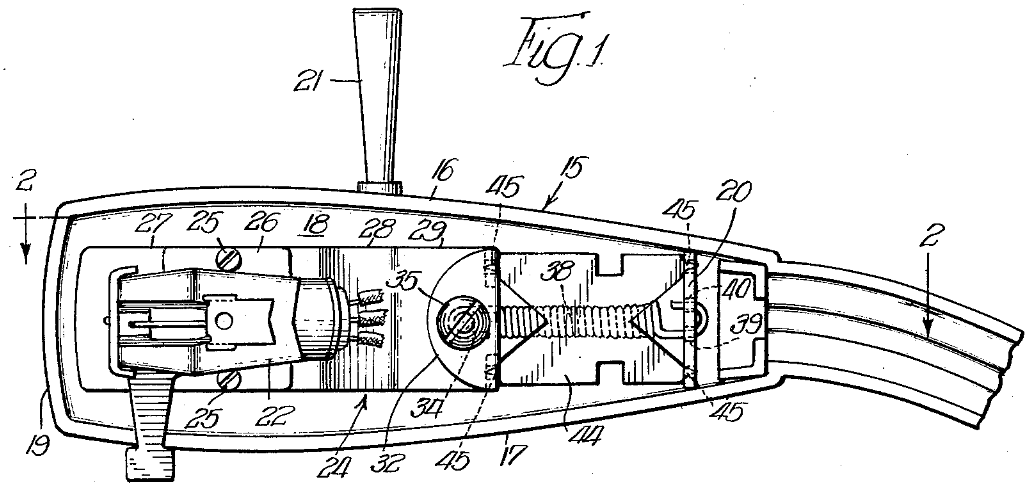
FIGURE 1 is a fragmentary bottom plan view of a tone arm embodying cartridge mounting mechanism in accordance with the invention.

Referring now to the drawings, there is shown a fragmentary portion of a tone arm housing 15 comprising opposed side walls 16 and 17, a top wall 18, and an outer end wall 19. A lift arm 21 is secured to the tone arm side wall 16 in the usual manner to facilitate manual lifting of the arm. A tone arm bracket 20 comprises a flat plate which is generally perpendicular to the axis of the tone arm and is welded or otherwise fixed to the tone arm housing 15. The fixed bracket 20 serves as a means for supporting a cartridge mounting mechanism from the tone arm, as will be more fully described hereinafter.

A cartridge 22 is fixedly secured to a cartridge bracket indicated generally at 24 by a pair of screws 25 which extend through a yoke 26 forming a part of the cartridge assembly and into threaded engagement with a generally horizontal flat plate portion 27 of the bracket 24. The cartridge bracket 24 extends upwardly and rearwardly at 28 and then rearwardly at 29, the rear end portion of the bracket being bent downwardly and then forwardly to provide a generally vertical rear plate portion 30 and a horizontal portion 32 which is substantially parallel to the upper plate portion 29.

A vertically disposed captive screw 34 having a head 35 extends through a hole in the horizontal plate portion 32 and upwardly through a suitable aperture in the upper plate portion 29 so as to project above the latter. The head 35 bears against the underside of the plate 32, and a suitable lock washer 36 or the like is secured at the upper end of the screw whereby the latter is prevented from moving vertically relative to the bracket 24. However, the captive screw may be manually rotated by means of a screw driver for purposes of adjustment, as will be explained more fully hereinafter.

A tension spring 38 extends through an opening 41 in the plate portion 30 and has one end wrapped around the captive screw 34, while its other end extends rearwardly and a hook thereon projects through a small hole 39 in the tone arm bracket 20 and then forwardly through an adjacent hole 40 therein so as to be anchored to the bracket. It will thus be seen that the spring 38 tends to urge the cartridge bracket 24 rearwardly toward the tone arm bracket 20.

In accordance with the invention, the angular relationship between the cartridge bracket 24 and the tone arm housing 15 is maintained constant while the cartridge bracket is permitted to move vertically relative to the tone arm. Accordingly, a pair of vertically spaced spacer members or spacer plates 42 and 44 are positioned between the vertical plate portion 30 and the tone arm bracket 20 to maintain a constant angular relationship therebetween. For example, in the embodiment being described, the members 20 and 30 are substantially parallel, and due to the provision of the spacers 42 and 44, the members 20 and 30 will remain parallel during vertical movement of the cartridge bracket 24 relative to the tone arm.

Figure 3:
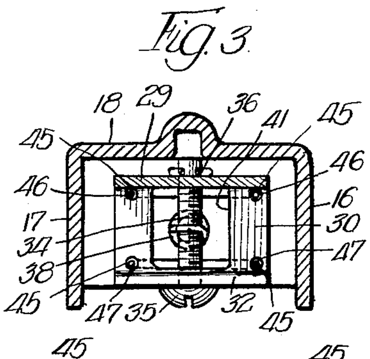
FIGURE 3 is a vertical section taken substantially along the line 3—3 of FIGURE 2.
Figure 4:
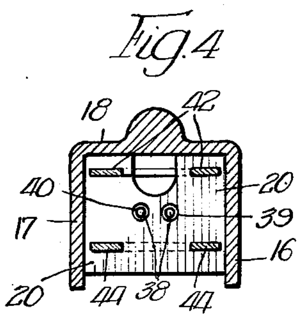
FIGURE 4 is a vertical section taken substantially along the line 4—4 of FIGURE 2.
Figure 5:
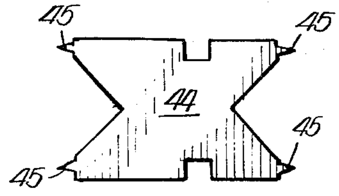
FIGURE 5 is a detail plan view of a spacer member which comprises one component of the cartridge mounting mechanism of FIGURES 1 and 2.

The spacers 42 and 44 are preferably substantially identical and each is provided with four generally triangular pivots or tangs 45, as best shown in FIGURE 5, which are adapted to project into small holes provided in the plates 20 and 30. Thus, the plate portion 30 of the cartridge bracket is provided with four small holes (see FIGURE 3), the upper two holes 46 being adapted to receive the forward pair of tangs on the spacer 42, and the lower pair of holes 47 being adapted to receive the forward pair of tangs on the spacer 44. The tone arm bracket 20 is provided with four similarly spaced holes, namely, an upper pair of holes to receive the rear pair of tangs on the spacer 42, and a lower pair of holes to receive the rear pair of tangs on the spacer 44.

The spacer members 42 and 44 are held between the plate portions 20 and 30 by the tension spring 38 which in effect compresses the spacers between said plates and thus maintains the plurality of tangs 45 seated in the respective holes provided therefor. It will be understood the pivots 45 may comprise knife edges, points, spherical ends, or other suitable pivot means other than the triangular tangs described hereinabove.

It is important to note that the angular relationship between the spacers 42 and 44 and the plate portions 20 and 30 will vary as the cartridge bracket 24 is moved vertically relative to the tone arm housing 15, such variation being permitted by the pivots 45. However, it should further be noted that the spacers 42 and 44 together with the plate portions 20 and 30 comprise in effect the sides of a parallelogram, and during vertical movement of the cartridge bracket 24 the angular position of the plate portion 30 is controlled by the two spacers 42 and 44 which swing through identical arcuate paths, whereby the upper and lower portions of the plate 30 move in identical paths, and the plate 30 remains parallel to the fixed bracket 20.

Figure 2:
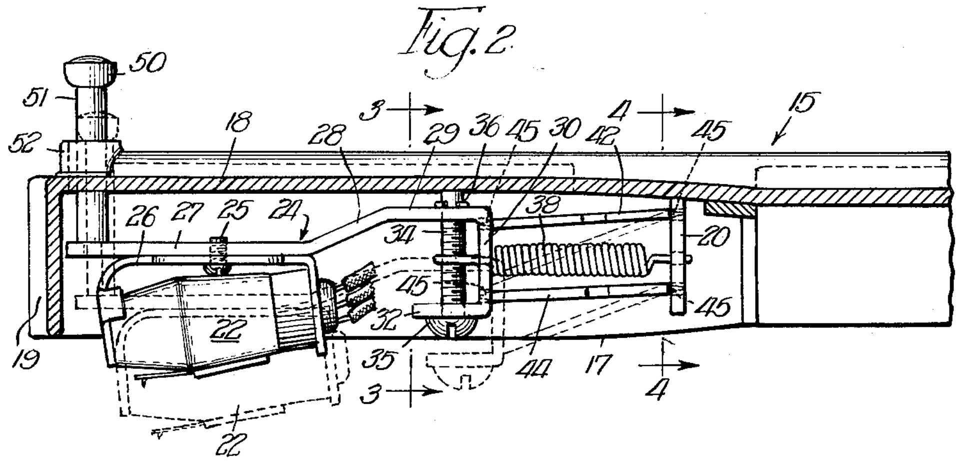
FIGURE 2 is a longitudinal section taken substantially along the line 2—2 of FIGURE 1, the cartridge being shown in solid lines in its uppermost postion relative to the tone arm and in dash lines in its lowermost relative position.

FIGURE 2 shows the cartridge mechanism in solid lines in its uppermost position with the upper end of the captive screw 34 engaging the underside of the top wall 18 of the tone arm, and it shows the mechanism in dash lines in its lowermost position wherein an enlarged upper end or knob 50 on a post 51 bottoms against an annular flange or sleeve 52 provided at the top of the tone arm housing. The post 51 is fixed to the forward end of the cartridge bracket plate 27 so as to project upwardly therefrom through an aperture in the tone arm top wall 18, and, as can be seen, it limits the extent to which the cartridge bracket 24 can be moved downwardly relative to the tone arm.

It will be seen from FIGURE 2 that in the uppermost position of the cartridge bracket 24, the plate portion 30 is parallel to the tone arm bracket 20. In the lowermost position of the cartridge bracket 24, the plate portion 30 has moved downwardly and somewhat rearwardly relative to the plate 20, but the plates 20 and 30 remain parallel to one another. In other words, the cartridge 22 is adapted to move vertically relative to the tone arm, but the angular relationship between the cartridge and the plane of a record being reproduced remains constant so as to avoid a change in the needle rake angle and avoid undesirable fluctuations in the output level of the system. In addition, the effective vertical dynamic mass of the cartridge and mounting bracket is inherently higher with the foregoing structure than with a pivotal system, so as to afford improved bass response without the addition of weights to the cartridge assembly.

It will be understood that in the preferred embodiment of the invention the spacers 42 and 44 are of equal length so that the forward ends thereof will move through identical arcuate paths and thus provide identical movement for the upper and lower ends of the plate portion 30. In other words, it is preferred that the two spacers together with the plates 30 and 20 comprise a parallelogram whereby the parallel sides will remain parallel during vertical movement of the cartridge. It will of course be recognized that some variation from the foregoing may be permitted while still obtaining substantially improved results over cartridges which simply pivot about a fixed horizontal axis.

It will further be understood that for a given needle pressure the position of the cartridge is determined by the tension spring 38. If it is desired to raise the cartridge, it is only necessary to rotate the captive screw 34 in a direction to lower the forward end of the spring. Similarly, to lower the position of the cartridge, it is only necessary to rotate the captive screw 34 in the opposite direction to raise the forward end of the spring 38. Thus, the use of a single tension spring which extends generally horizontally above one of the spacers and below the other serves as a useful expedient for compressing the spacers between the brackets 20 and 24 and also as a means for adjusting the position of the cartridge for a given needle pressure. In operation, the spring 38 is adjusted so that during the reproduction of a recording the cartridge 22 will move vertically relative to the tone arm through a desired range of playing positions without assuming either of the limiting positions shown in FIGURE 2.

While a certain preferred form of my invention has been described and illustrated, it will be appreciated that modifications and changes may be made therein by those skilled in the art, particularly with my disclosure before them, and thus I do not intend to be limited to the particular disclosure, except insofar as the appended claims are so limited.

I claim:

1. In a phonograph tone arm, cartridge mounting mechanism for mounting a cartridge in a vertically compliant manner, comprising, in combination, a tone arm bracket fixedly secured to the tone arm, a cartridge bracket adapted to mount a cartridge, and a pair of vertically spaced spacer members positioned between said tone arm bracket and said cartridge bracket, each of said spacer members having one end pivotally associated with said tone arm bracket and its other end pivotally associated with said cartridge bracket.

2. In a phonograph tone arm, cartridge mounting mechanism for mounting a cartridge in a vertically compliant manner, comprising, in combination, a tone arm bracket fixedly secured to the tone arm, a cartridge bracket adapted to mount a cartridge, and a pair of vertically spaced spacer members positioned between said tone arm bracket and said cartridge bracket, each of said spacer members having a pair of laterally spaced pivots at each end with one pair of pivots being associated with said tone arm bracket and the other pair of pivots being associated with said cartridge bracket.

3. In a phonograph tone arm, cartridge mounting mechanism for mounting a cartridge in a vertically compliant manner, comprising, in combination, a tone arm bracket fixedly secured to the tone arm, a cartridge bracket adapted to mount a cartridge, a tension spring having one end secured to said tone arm bracket and its other end secured to said cartridge bracket, and a pair of vertically spaced spacer members positioned between said tone arm bracket and said cartridge bracket and held in compression therebetween by said tension spring, each of said spacers having one end pivotally associated with said tone arm bracket and its other end pivotally associated with said cartridge bracket.

4. In a phonograph tone arm, cartridge mounting mechanism for mounting a cartridge in a vertically compliant manner, comprising, in combination, a tone arm bracket fixedly secured to the tone arm, a cartridge bracket positioned generally forwardly of said tone arm bracket and adapted to mount a cartridge, a tension spring having one end secured to said tone arm bracket and its other end secured to said cartridge bracket, and a pair of vertically spaced spacer members positioned between said tone arm bracket and said cartridge bracket and held in compression therebetween by said tension spring, each of said spacer members having a pair of laterally spaced pivots at each end with one pair of pivots being associated with said tone arm bracket and the other pair of pivots being associated with said cartridge bracket.

5. The combination of claim 4 wherein one of said spacer members is disposed above said spring and the other of said members is disposed below said spring.

6. In a phonograph tone arm, cartridge mounting mechanism for mounting a cartridge in a vertically compliant manner, comprising, in combination, a tone arm bracket secured to the tone arm and generally transverse to the longitudinal axis thereof, a cartridge bracket adapted to mount a cartridge and having a rear portion which is forwardly of and generally parallel to said tone arm bracket, a tension spring having one end secured to said tone arm bracket and its other end secured to said cartridge bracket, and a pair of vertically spaced parallel spacer members of substantially equal length positioned between said tone arm bracket and said rear portion of said cartridge bracket and held in compression therebetween by said tension spring, each of said spacer members having a pair of laterally spaced pivots at each end with one pair of pivots being associated with said tone arm bracket and the other pair of pivots being associated with said rear portion of said cartridge bracket.

7. In a phonograph tone arm, cartridge mounting mechanism for mounting a cartridge in a vertically compliant manner, comprising, in combination, a tone arm bracket fixedly secured to the tone arm, a cartridge bracket adapted to mount a cartridge, a generally vertical captive screw carried by the rear portion of said cartridge bracket, a tension spring having one end secured to said tone arm bracket and its other end wrapped around said screw whereby the vertical position of the latter end may be adjusted by rotating said screw, and a pair of spacer members disposed above and below said spring, respectively, and extending between said tone arm bracket and said cartridge bracket, said spacer members being held in compression therebetween by said tension spring, and each of said spacers having one end pivotally associated with said tone arm bracket and its other end pivotally associated with said cartridge bracket.

8. The combination of claim 7 wherein each of said spacer members is provided with a pair of laterally spaced pivots at each end with one pair of pivots being associated with said tone arm bracket and the other pair of pivots being associated with said cartridge bracket.

9. In a phonograph tone arm, cartridge mounting mechanism comprising, in combination, a tone arm bracket secured to the tone arm and generally transverse to the longitudinal axis thereof, a cartridge bracket adapted to mount a cartridge and having a rear plate portion which is forwardly of and generally parallel to said tone arm bracket, a generally vertical captive screw carried by said cartridge bracket, a tension spring having one end secured to said tone arm bracket and its other end wrapped around said screw whereby the vertical position of the latter end may be adjusted by rotating said screw, and a pair of parallel spacer members of substantially equal length extending between said tone arm bracket and said plate portion, one above and one below said tension spring and held in compression between said bracket and plate portion by said spring, each of said spacer members having a pair of laterally spaced pivots at each end with one pair of pivots being associated with said tone arm bracket and the other pair of pivots being associated with said rear portion of said cartridge bracket.

10. The combination of claim 9 wherein said pivots comprise small tangs which are adapted to project into holes provided therefor in said tone arm bracket and said rear plate portion of said cartridge bracket.

References Cited by the Examiner

UNITED STATES PATENTS 2,294,576 9/42 Schneider ______________ 274—23

FOREIGN PATENTS 968,828 4/58 Germany.

LOUIS J. CAPOZI, *Primary Examiner.*

ANTONIA F. GUIDA, *Examiner.*